United States Patent [19]
Narita

[11] Patent Number: 4,955,259
[45] Date of Patent: Sep. 11, 1990

[54] LINE PRESSURE CONTROL ARRANGEMENT FOR AUTOMATIC AUTOMOTIVE TRANSMISSION

[75] Inventor: Yasushi Narita, Yokohama, Japan

[73] Assignee: Nissan Motor Co., Ltd., Yokohama, Japan

[21] Appl. No.: 337,869

[22] Filed: Apr. 14, 1989

[30] Foreign Application Priority Data

Apr. 15, 1988 [JP] Japan .................................. 63-91813

[51] Int. Cl.$^5$ .............................................. B60K 41/06
[52] U.S. Cl. ........................................ 74/866; 74/867
[58] Field of Search .............. 74/866, 867; 192/109 F; 364/424.1

[56] References Cited

U.S. PATENT DOCUMENTS

| | | | |
|---|---|---|---|
| 4,283,970 | 8/1981 | Vukovich | 74/866 |
| 4,506,563 | 3/1985 | Hiramatsu | 74/867 |
| 4,519,273 | 5/1985 | Shimizu et al. | 74/866 X |
| 4,653,350 | 3/1987 | Downs et al. | 74/864 |
| 4,669,335 | 6/1987 | Matsuoka et al. | 74/866 |
| 4,671,139 | 6/1987 | Downs et al. | 74/866 |
| 4,680,992 | 7/1987 | Hayasaki et al. | 74/869 |
| 4,718,309 | 1/1988 | Moriya | 74/866 |
| 4,742,461 | 5/1988 | Eschrich et al. | 364/424.1 |
| 4,789,936 | 12/1988 | Kurihara et al. | 74/866 X |
| 4,796,490 | 1/1989 | Butts et al. | 74/866 |
| 4,823,646 | 4/1989 | Yoshimura et al. | 74/866 |
| 4,838,124 | 6/1989 | Hamano et al. | 74/866 |
| 4,882,952 | 11/1989 | Kashihara et al. | 74/867 |

OTHER PUBLICATIONS

Service Manual, Nissan Motor Company, 3/1987; pp. 1–90.

*Primary Examiner*—Dwight Diehl
*Attorney, Agent, or Firm*—Foley & Lardner, Schwartz, Jeffery, Schwaab, Mack, Blumenthal & Evans

[57] ABSTRACT

During non-shift modes of transmission operation, the line pressure is controlled according to a basic line pressure control schedule. Upon a shift being initiated it is determined if the shift is being conducted under power ON or power OFF conditions by sensing the status of an idle switch associated with the engine throttle valve. In the case of a power ON shift, first and second maps which are record solenoid valve duty cycle in terms of engine load and vehicle speed are read out of memory and sequentially used one after the other to control the line pressure during the shifting. In the case of a power OFF shift, tables recorded in terms of duty cycle and vehicle speed are fetched and used one after the other. The changing from the first map or table to the second one is determined by comparing the rotational speed ratio which exists between the input and output shafts of the transmission with a shift solenoid control schedule which relates to the type of shift and which is being conducted and which is recorded in terms of gear ratio and engine load (e.g. throttle opening).

11 Claims, 6 Drawing Sheets

FIG. 8A
(LOW SPEED 1-2 UPSHIFT-POWER ON)

FIG. 8B
(HIGH SPEED 1-2 UPSHIFT-POWER ON)

LINE PRESSURE CONTROL ARRANGEMENT FOR AUTOMATIC AUTOMOTIVE TRANSMISSION

BACKGROUND OF THE INVENTION

1. Field of the Invention

The present invention relates generally to a line pressure control arrangement for automatic automotive transmissions and more specifically to a line pressure control arrangement which enables the appropriate control of line pressure during a plurality of different shifting operations.

2. Description of the Prior Art

An automatic transmission Service Manual (publication A261CO7) issued in Mar. 1987 relating to the so called RE4RO1A type transmission describes an arrangement which utilizes tabled data for controlling the line pressure during shifting and non-shifting modes of transmission operation. In this arrangement the engine throttle valve opening degree is used to determine the duty cycle of a signal used to control a line pressure control solenoid valve.

However, with this arrangement, because the line pressure is controlled by a single throttle valve position (engine load). Line pressure schedule during shifting operations, it has been found very difficult to successfully control the line pressuring during all of the various shift possibilities. For example, the line pressure level required during a power ON shift is greater than in the case of a corresponding power OFF shift. Further, if the shift occurs at a high vehicle speed the required level of line pressure is higher than in the case the same or similar shift occurs at low speeds even though the position of the throttle valve may be the same.

In addition to this, as this control schedule is not vehicle speed responsive it cannot appropriately regulate the line pressure during shifts which are induced in response to the manual manipulation of the vehicle shift lever. Viz., when a driver manually operates the vehicle shift lever in a manner which forces a downshift outside of the normal load-vehicle speed shift control schedule.

A further problem has been encountered with this type of arrangement in that, when the vehicle is coasting with the throttle valve fully closed, and the transmission undergoes a power OFF 1-2 upshift, a one-way clutch which is included in the transmission gear train, assumes a released position and idles while the engagement level is low. At the same time an accumulator, which is designed to attenuate shift shock at higher load maintains the line pressure which is supplied to a selected friction element (namely the second speed apply chamber 2A of a band brake servo), at a reduced level during this particular shift. This induces the situation wherein, as the line pressure is induced to assume a low level during coasting it does not undergo a timely sharp increase as the pressure reducing function of the accumulator termination is delayed leads to the situation wherein the friction element which is operated by this servo is not strongly engaged and can occur excessive slippage which deteriorates the shift feeling.

SUMMARY OF THE INVENTION

It is an object of the present invention to provide a line pressure control system which can overcome the above described type of problems and which is responsive to vehicle speed and can selectively control the line pressure to appropriate levels during each of the various number of different shifts which occur during vehicle operation.

In brief, the above objects are achieved by an arrangement wherein, during non-shift modes of transmission operation, the line pressure is controlled according to a basic line pressure control schedule. Upon a shift being initiated it is determined if the shift is being conducted under power ON or power OFF conditions by sensing the status of an idle switch associated with the engine throttle valve. In the case of a power ON shift, first and second maps which are record solenoid valve duty cycle in terms of engine load and vehicle speed are read out of memory and sequentially used one after the other to control the line pressure during the shifting. In the case of a power OFF shift, tables recorded in terms of duty cycle and vehicle speed are fetched and used one after the other. The changing from the first map or table to the second one is determined by comparing the rotational speed ratio which exists between the input and output shafts of the transmission with a shift solenoid control schedule which relates to the type of shift and which is being conducted and which is recorded in terms of gear ratio and engine load (e.g. throttle opening).

More specifically, a first aspect of the present invention is deemed to comprise a control system for an automatic transmission, the transmission having an input shaft and an output shaft, the transmission being mounted in a vehicle having an engine, the engine being operatively connected with the input shaft and including means for indicating the load on the engine, and the vehicle including unit for indicating the vehicle speed, the control system featuring: a line pressure control solenoid; first and second sets of power on duty cycle control data, the first and second sets of power on duty cycle control data being organized in the form of first and second maps, the first and second maps containing duty cycle values which are each located at different engine load and vehicle speed coordinates; first and second sets of power off duty cycle control data, the first and second sets of power off duty cycle control data being organized in the form of first and second tables, the first and second tables each defining a duty cycle schedule which is plotted in terms of duty cycle and vehicle speed; a control circuit for controlling the line pressure control solenoid, the control circuit including a memory in which the first and second sets of power on duty cycle data and the first and second sets of power off duty cycle data, are recorded, the control circuit including a circuit unit which is responsive to engine load and vehicle speed for determining the need to induce a shift between gears of the transmission and for conditioning the transmission in a manner which induces the shift to occur, the control circuit being further responsive to the engine load indicating unit for: when the engine load indicating unit indicates that a load on the engine exists, selecting the first and second sets of power on duty cycle control data and for sequentially using the first and second sets of power on duty cycle data one after the other to control the operation of the line pressure control solenoid during the time the shift between gears is occurring, and for when the engine load indicating means indicates that a load on the engine is absent, selecting the first and second sets of power off duty cycle control data and for sequentially using the first and second sets of power off duty cycle data to control the operation of the line pressure control solenoid during the time the shift between gears is occurring.

A second aspect of the present invention is deemed to comprise a transmission control system which features: a unit for discerning between a power on shift and a power off shift, the power on shift being one wherein an engine which is associated with a transmission controlled by the transmission control system is subject to a load, and the power off shift being one wherein load on the engine is absent; a unit for selecting first and second sets of power on duty cycle control data when the discerning unit discerns a power on shift occurring, the first and second sets of power on duty cycle control data being organized in the form of first and second maps, the first and second maps containing duty cycle values which are each located at different engine load and vehicle speed coordinates; a unit for selecting first and second sets of power off duty cycle control data when the discerning means discerns a power off shift occurring, the first and second sets of power off duty cycle control data being organized in the form of first and second tables, the first and second tables each defining a duty cycle schedule which is plotted in terms of duty cycle and vehicle speed; and a unit for utilizing the selected first and second sets of data sequentially one after the other to control the operation of a line pressure control solenoid during a shift of the transmission controlled by the control system.

A third aspect of the present invention is deemed to comprise a method of operating a transmission control system, the method featuring: discerning between a power on shift and a power off shift; selecting first and second sets of power on duty cycle control data when the discerning unit discerns a power on shift occurring, the first and second sets of power on duty cycle control data being organized in the form of first and second maps, the first and second maps containing duty cycle values which are each located at different engine load and vehicle speed coordinates; selecting first and second sets of power off duty cycle control data when the discerning unit discerns a power off shift occurring, the first and second sets of power off duty cycle control data being organized in the form of first and second tables, the first and second tables each defining a duty cycle schedule which is plotted in terms of duty cycle and vehicle speed; and utilizing the selected first and second sets of data sequentially one after the other to control the operation of line pressure control solenoid during a shift of the transmission controlled by the control system.

DETAILED DESCRIPTION OF THE PREFERRED EMBODIMENT

Figure 1:
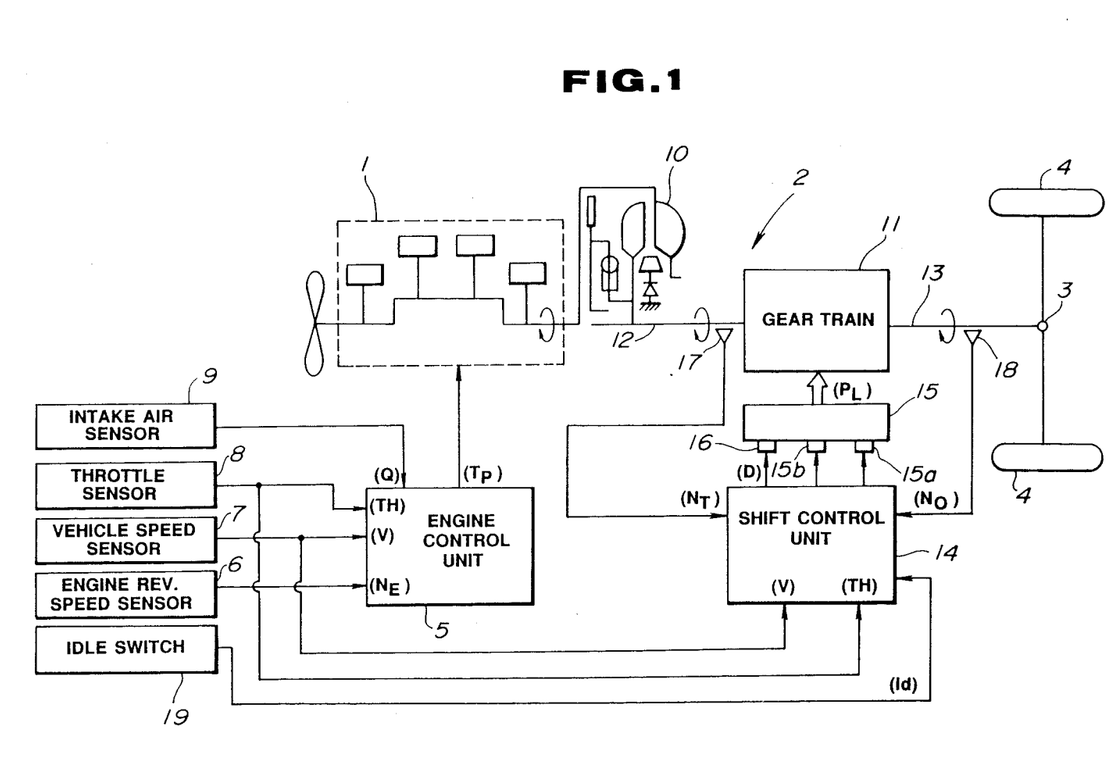
FIG. 1 is a schematic drawing showing an automotive power train which is equipped with an embodiment of the present invention.

FIG. 1 shows a power train to which an embodiment of the present invention is applied. In this arrangement an electronically fuel injected internal combustion engine 1 is operatively connected by way of a power train (generally denoted by the numeral 2) with a differential gear 3. Driving wheels 4 are connected to the differential 3.

It should be understood that even though FIG. 1 shows a F-R power train (front engine-rear wheel drive) the present invention is not limited to the same and can be applied to FF, MR or four-wheel drive 4WD type arrangements if so desired.

The engine control system includes an engine control unit 5 which is supplied inputs from an engine speed sensor 6, a vehicle speed sensor 7, a throttle position sensor 8, and an intake air sensor 9.

Based on the inputs of sensors 6 to 9, the control unit 5 which in this instance includes a microprocessor (not show), derives the appropriate injection control pulse width and applies the same to the fuel supply system of the engine.

In this embodiment, the power train 2 includes a RE4RO1A type transmission developed by NISSAN MOTOR CO. LTD., the construction and arrangement of which is described in detail in the Service Manual A261CO7 published by the above mentioned company.

A torque converter 10 including a lock-up clutch provides an operative connection between the output shaft of the engine and an input shaft 12 of a gear train 11. A transmission output shaft 13 provides a drive connection between the differential or final gear 3 and the transmission.

The system includes a shift control unit 14 which also includes a microprocessor. This unit 14 is arranged to issue control signals to a control valve unit 15 which forms part of the transmission. The control valve unit 15 includes three solenoids 15a, 15b and 16.

In this embodiment the transmission takes the form of a RE4RO1A type (mentioned above) which includes a gear train comprising a plurality of planetary gear units, and associated hydraulically operated clutches and brakes (not shown). The brakes and clutches are operated by the supply of so called "line pressure" PL which is selectively supplied from the control valve unit 15.

The hydraulic spool valve system (not shown) which is included in the control valve unit 15 is controlled in response to the selective energizations of the solenoids 15a and 15b, and includes a plurality of accumulators including one which is arranged to attenuate 1-2 shift shock. This accumulator is arranged to modify the level of line pressure which prevails in the second speed apply chamber 2A of a band brake servo which forms part of the above identified RE4RO1A type of transmission.

Depending on the energization of solenoids 14a and 15b, the transmission is conditioned to selectively produce a number of different gear ratios by selectively inducing line pressure PL to be supplied to the appropriate friction elements.

In this instant arrangement four forward gear ratios of the transmission can be produced in the manner indicated in the table below.

TABLE

| GEAR: | FIRST | SECOND | THIRD | FOURTH |
|---|---|---|---|---|
| SOL. 15a: | ON | OFF | OFF | ON |
| SOL. 15b: | ON | ON | OFF | OFF |

The third solenoid 16 of the control valve unit 15 is arranged to be operated on a variable duty cycle and to control the level of the line pressure PL. With this arrangement as the duty cycle increases the level of the line pressure is increased.

The shift control unit 14 is arranged to receive data inputs NT and NO from rotational speed sensors 17 and 18 respectively. As will be appreciated from the drawings, NT is indicative of the rotational speed of the input shaft 12 of the transmission while NO is indicative of the rotational speed of the transmission output shaft 13.

It is worth noting that the output of the sensor 18 can be used additionally as a vehicle speed indicative signal if so desired.

This unit 14 further receives data inputs V, TH and Id from the vehicle speed sensor 7, the throttle position sensor 8 and an idle switch 19. The Id signal is used, in the instant embodiment, to differentiate between power ON and power OFF modes of operation. Viz., when the throttle valve closes to the point that the idle switch is closed, it can be assumed that no power is demanded and that a so called power OFF shifting mode of control can be employed.

Figure 2:
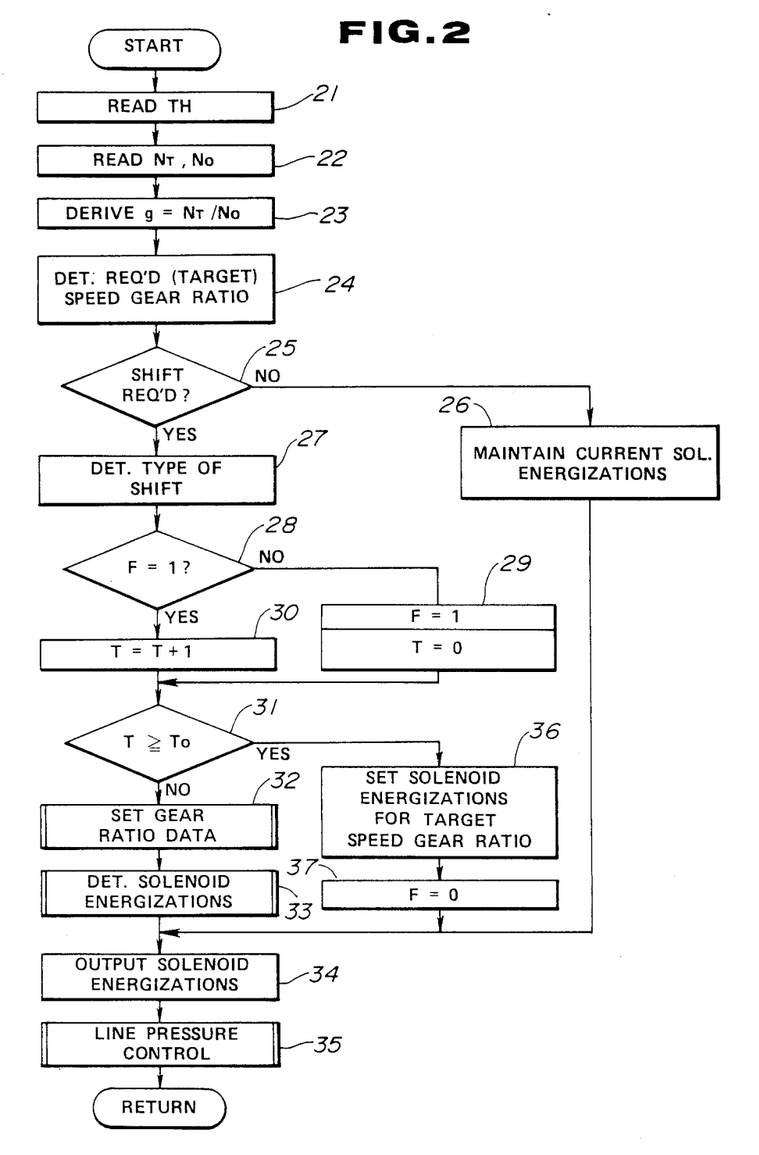
FIG. 2 is a flow chart depicting the steps which are executed by a main control routine during the operation of the embodiment of the present invention.
Figure 3:
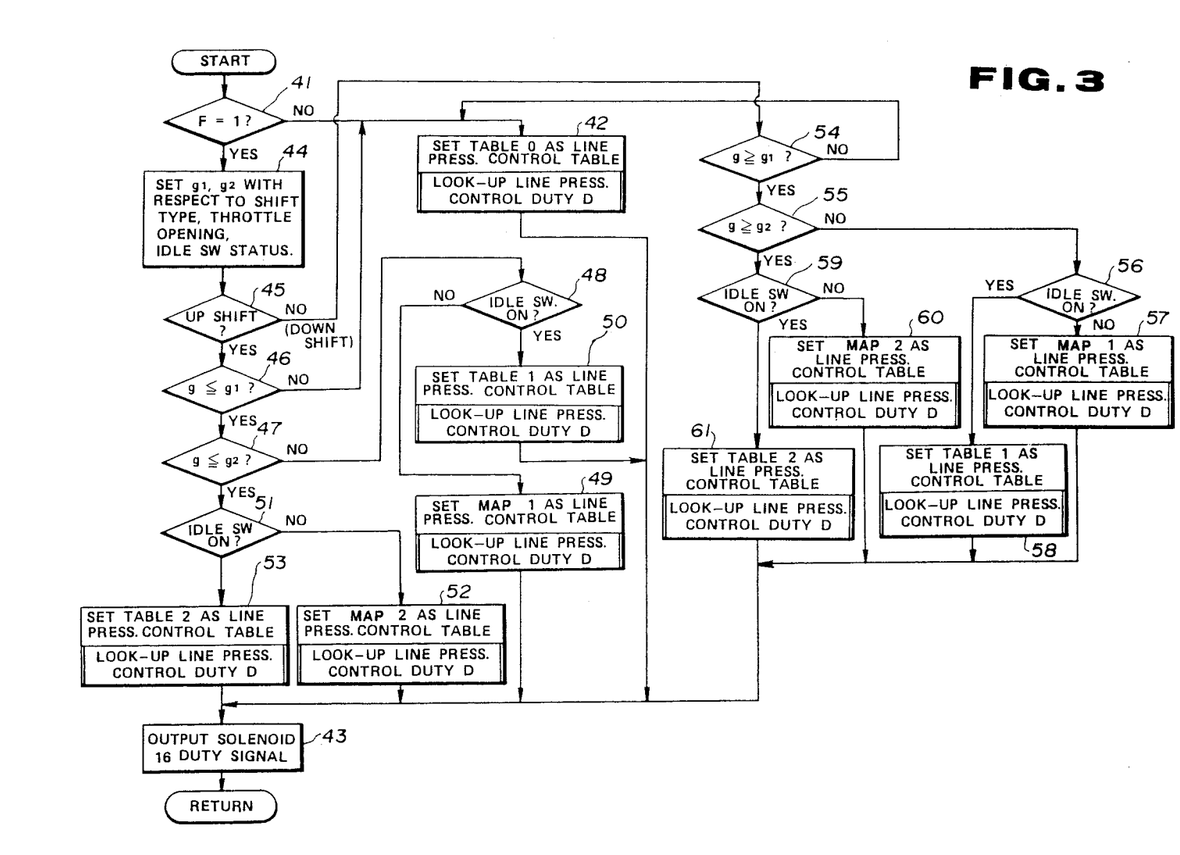
FIG. 3 is a flow chart depicting the steps which are executed in accordance with a sub-routine which is run in the main control shown in FIG. 2.

Programs of the nature depicted in the flow charts of FIGS. 2 and 3 are run in the shift control unit microprocessor in order to derive the appropriate solenoid control signals. In this embodiment the main control routine shown in FIG. 2 is arranged to be run at 10 msec intervals (by way of example).

The main control routine is arranged such that at steps 21 and 22, the outputs of sensors 8, 17 and 18 are sampled and the instant values of TH, NT and NO are sampled and set in memory for further processing. At step 23 the ratio g of the transmission input shaft speed NT to the transmission output shaft speed NO is derived.

Following this, at step 24 the output of the vehicle speed sensor 7 is sampled and the instant value of V set in memory. This vehicle speed data is then used in combination with the instant throttle valve position TH value to determine, from shift pattern table data (not shown), the most appropriate gear (i.e. speed gear ratio) for the transmission to be conditioned to produce. This is logged as the instant target gear.

At step 25 the instant gear the transmission is conditioned to produce is compared with the target one. If there is no difference, the program flows to step 26 wherein a command which maintains the current energization status of the solenoids 15a and 15b, is issued, and the routine then proceeds to steps 34 and 35 where energization signals are outputted to the solenoids and a line pressure sub-routine is performed. Note that this just mentioned sub-routine will be described later in connection with the flow chart shown in FIG. 3.

However, if at step 25 it is discovered that there is a difference between the target gear and current one the transmission is conditioned to produce, then the routine flows to step 27 wherein the type of shift which must be implemented to change from the instant gear and achieve the target one is determined.

Next, at step 27 the instant status of a "shift in progress" flag F is determined. If the value of this shift flag is not "1" indicating that no shift is currently being performed, then the routine flows across to step 29 where the value is set to 1 and a timer count T set to zero. Following this, the program loops to step 31.

On the other hand, if the outcome of the enquiry conducted at step 28 is affirmative, then at step 30 the count of timer T is incrementally increased.

Step 31 is arranged to check the count of timer T and to determine if a predetermined period of time (indicated by To) has elapsed or not. While this period has not slapsed the routine flows to steps 32 and 33.

Figure 4:
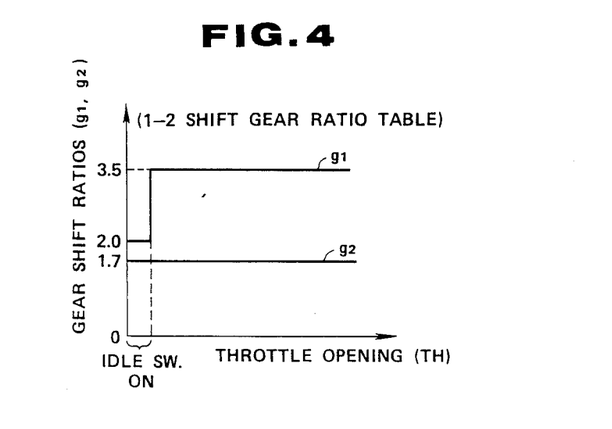
FIG. 4 is a charts showing, in terms of engine throttle valve opening and gear shift ratio values g1 and g2, the control characteristics which are used during a 1-2 upshift.
Figure 5:
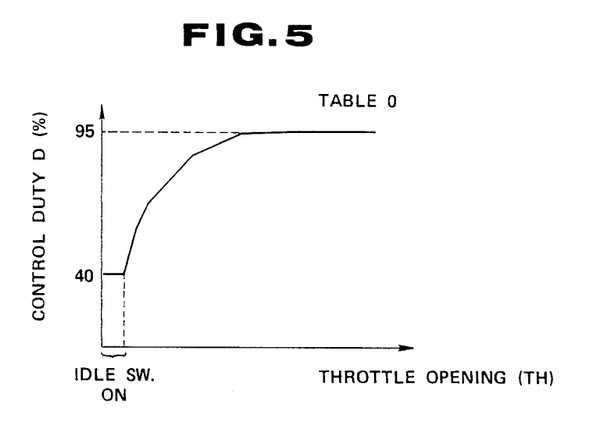
FIG. 5 is a table which shows in terms of throttle opening and duty cycle, a basic line pressure control schedule which is used during before and after a shift operation is executed.
Figure 6A:
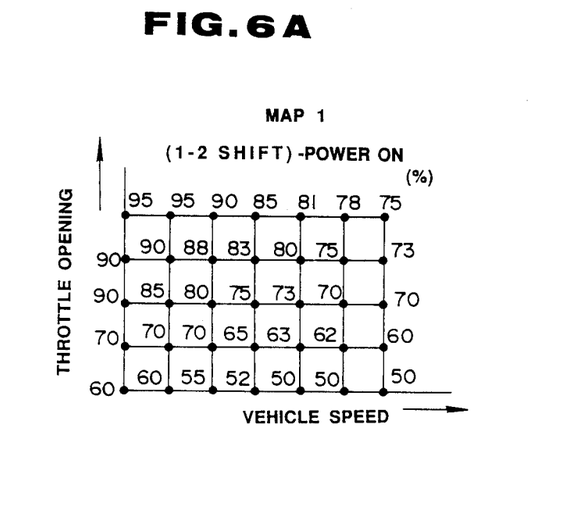
FIGS. 6A and 6B show first and second power ON 1-2 upshift line pressure control maps in which duty cycle values are registered at addresses defined at predetermined engine throttle valve position and vehicle speed intervals.
Figure 6B:
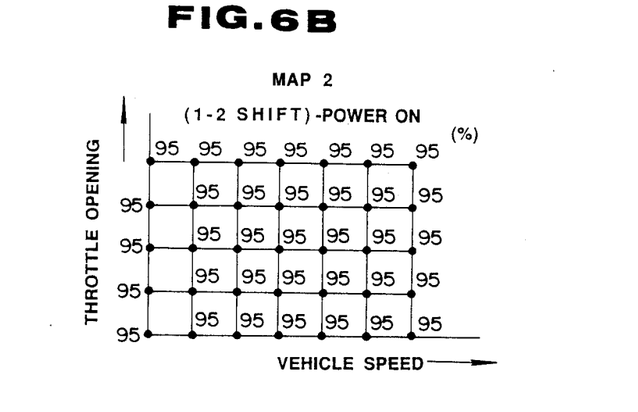

In step 32 the gear ratio data necessary to implement the shift which is indicated as being necessary in step 27, is read out of memory. For example, if a 1–2 upshift is indicated as being necessary, the data such as that depicted in FIG. 4 is read out of memory and set ready for use.

At step 33 the instant value of g is compared with the values of g1 and g2 of the data prepared in step 32. Depending on the outcome of this comparison the energization pattern of the solenoids 15a and 15b is determined.

Until timer T has reached the To count, the routine continues to flow through steps 32 to 34. Accordingly, as each run is made, the instant value of g is updated until such time as it becomes equal to, or less than, g2. In the case of a 1–2 upshift, no change in the solenoid energization pattern is required. On the other hand, in the case of a 1–4 upshift, by way of example, the solenoid conditioning is revised upon the value of g falling to this limit. However, as will become clear later, a change from one "shift in progress" type line pressure control map or table is induced in response to this occurrence.

When timer T has reached the count To indicative of the above mentioned period having elapsed (step 31), the flow of the routine changes and it then flows across to step 36 where the post shift decision solenoid energization settings, which are necessary to condition the transmission to produce the target gear, are issued. Viz., upon the expiration of the predetermined time, it can be assumed that the shift has been completed and that the various intermediate controls have been completed and that the transmission is now ready to be set to produce the gear indicated as being necessary in step 27.

By way of example, in the case a 1–4 shift is indicated as being necessary in step 27, it is necessary to break this into a 1–3 and a 3–4 shift in order to smooth the overall process. To implement this staged shifting, until the value of g reduces to the g2 limit the transmission is conditioned so that it tends to assume a 1–3 shift condition. Upon this limit being reached, the solenoid energization pattern is then revised in a manner which induces a fourth speed engagement conditioning. By the time the timer T has finished counting the engagement of fourth speed will be completed or sufficiently close thereto to ensure that conditioning for fourth speed will not produce any detrimental shocks.

For further information relating to the type of operations which are performed in the above mentioned steps 32 and 33 reference can had to copending United States Patent Application which was filed on Mar. 29, 1989 in the name of Yasushi NARITA which claims a priority based on Japanese Patent Application No. 63-73460 filed on Mar. 29, 1988 by the same entity as the instant application is assigned. The content of this document is hereby incorporated by reference thereto.

FIG. 3 shows a flow chart which depicts the steps performed by the line pressure control sub-routine which is run at step 35. As will be appreciated the first step (41) of this routine is such as to determine the instant status of the shift flag F. In the event that the shift flag has not be set to "1" then it is assumed that the transmission is not in the process of undergoing a shift between gears and the routine flows across to step 42 where Table 0 is read out and set as the instant line pressure control table. Viz., it will be noted that Table 0 is used for line pressure control during non-shift modes of operation. The appropriate duty cycle to be applied to solenoid 16 is then looked up from Table 0.

On the other hand, if the shift flag F has been set to "1", indicating that a shift mode has been entered, then the program flows to step 44. In this step the instant g1 and g2 values which will be used for the solenoid energization control are established on the basis of the type of shift which is indicated as being necessary, the throttle position TH and the status of the idle switch. These g1 and g2 values can be read off the data which is set in memory in step 32 and set in memory ready for further processing.

It will be noted that in the case of upshifts g1>g2. In the case of downshifts, the situation is reversed viz., g2>g1. The reason for this is deemed obvious.

Next, in step 45, the type of shift which is apt to be induced by the instant set of operating conditions is screened in a manner which enables it to be determined if the shift will be an upshift or not. In the case of an affirmative outcome, the routine proceeds to step 46 wherein it is determined if the instant g value is less than or equal to g1. In the case of an affirmative outcome the routine proceeds to step 47 wherein the instant value of g is compared with g2 in a manner which determines if it is less than or equal to the same.

In the case of a negative outcome in step 46 the routine flows to step 42, it being indicated that the system is operating in a quasi non-shift mode and induces the use of Table 0 for the line pressure control. On the other hand, in the case of a negative outcome in the enquiry conducted in step 47 it is deemed that the an upshift (e.g. a 1-2 upshift) is in progress and the routine goes to step 48 where the instant status of the idle switch is determined. In the case where the switch is ON (indicating a power OFF mode) the routine proceeds to step 50 wherein a duty cycle deemed suitable for the instant set of circumstances (viz., power OFF shifting) is established using TABLE 1. Following this the routine proceeds to step 43 wherein the duty cycle selected is implemented.

In the case where the outcome of the inquiry conducted at step 48 reveals that the idle switch in not ON (viz., is OFF) the condition wherein the throttle is not fully closed and a power ON type of line pressure control should be used, is indicated. Accordingly, the routine flows to step 49 wherein MAP 1 is selected and the appropriate duty for the instant throttle opening degree TH and vehicle speed V (viz., the values recorded in steps 21 and 24) is determined by look-up.

On the other hand, in the event that the routine flows to step 51, the idle switch status is checked. In the event that it is not ON (indicating a power ON mode requirement), the routine flows to step 52 where the MAP 2 data for the instant type of shift (e.g. 1-2 upshift) is set as the duty cycle for the signal by which the line pressure solenoid 16 is operated. The appropriate duty cycle is then determined using the instant values of TH and V.

However, in the event that the idle switch is found to be ON, then at step 53 TABLE 2 is used to determine the line pressure control duty cycle.

Steps 54 to 61 are directed to downshift control. These steps are essentially similar to steps 45 to 53 and are arranged to screen the instant value of g against g1 and g2 as set in step 44, and to induce the use of MAPS 1 or 2 of the use of TABLES 1 or 2 as the situation demands.

Figures 8A, 8B:
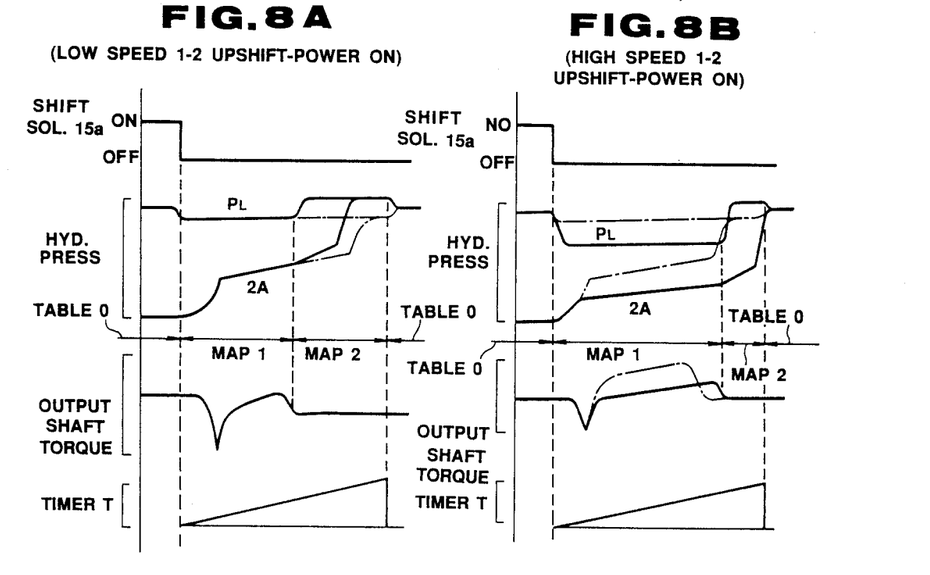
FIGS. 8A and 8B are timing charts which depict the changes which occur during a power ON 1-2 upshift during low and high speeds, respectively.

The control provided by the instant embodiment of the invention is deemed to be clear from the timing charts of FIGS. 8A and 8B. As will be noted these charts relate to a power ON 1-2 upshift. Table 0 is used when the system is not undergoing a shift, while once having entered a shift mode, the appropriate TABLE 1 or MAP 1 data (depending on which power mode is employed) is used until such time as the g value reaches the g2 level. Following this event, the appropriate TABLE 2 or MAP 2 data is used to control the level of the line pressure until the timer T indicates the end of the shift. The effect of this type of control is demonstrated by the trace PL which forms part of the "hydraulic pressure" section of the FIG. 8A and 8B timing charts.

As will be noted from the above mentioned timing charts, as indicated by the solid line traces, while MAP 1 is being used, the line pressure is lowered as compared with that which tends to be provided by TABLE 0.

On the other hand, upon MAP 2 being employed, the level of line pressure is elevated above that which would be provided by TABLE 0. This boosted level which is provided toward the end of the shift, speeds up the stroking of the 1-2 accumulator and hastens the timing with which the pressure reducing effect on the pressure prevailing in the 2A chamber stops, particularly noticeable during low speed power ON 1-2 upshifts. The reason for this is that, as will be noted in FIG. 8A the time for which the elevated line pressure is applied, is longer than in the case of a high speed 1-2 power ON upshift.

The characteristics produced by the instant invention can be compared with the phantom line traces which depict the characteristics produced with the previously proposed arrangement discussed in the opening paragraphs of the instant disclosure.

Figure 7A:
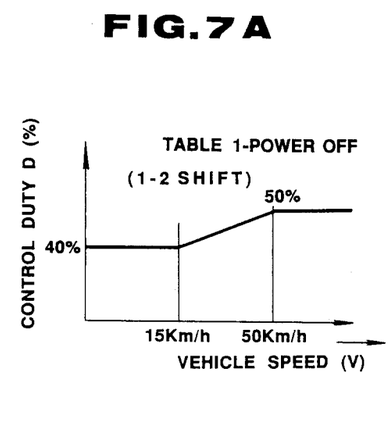
FIGS. 7A and 7B show power OFF 1-2 upshift line pressure control tables in which line pressure solenoid control duty cycles are recorded in terms of vehicle speed.
Figure 7B:
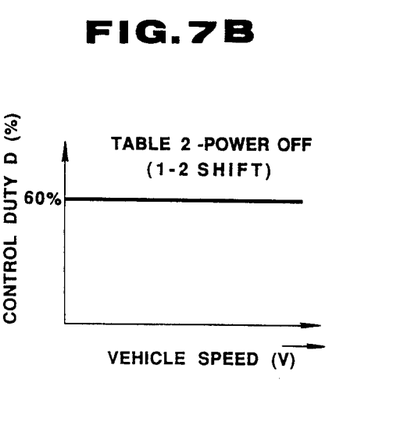

In the case where the throttle valve opening is at a minimum value closing the idle switch 19, and the shift lever is manually moved from first speed range to second speed range, as shown in FIGS. 7A and 7B, as the vehicle speed increases, the duty cycle D increases. Accordingly, with the increase in vehicle speed, the level of line pressure is increased and the appropriate increase in friction element engagement is provided. Again under these conditions, the stroking of the 1-2 accumulator is induced to finish at an early timing and thus promotes improved shift feeling.

Although the instant embodiment has been disclosed as using throttle position, it will be understood that the invention is not limited to this parameter and other parameters indicative of engine load, such as air induction volume, injection pulse width, ignition timing and the like can be used in place of and/or in conjunction therewith.

What is claimed is:

1. In a control system for an automatic transmission of a vehicle, said transmission having an input shaft and an output shaft, said transmission being mounted in a vehicle having an engine, said engine being operatively connected with said input shaft and including means for indicating the load on the engine, said vehicle including means for indicating the vehicle speed, said system comprising:

a line pressure control solenoid;

first and second sets of power on duty cycle control data, said first and second sets of power on duty cycle control data being organized in the form of first and second maps, said first and second maps containing duty cycle values which are each located at different engine load and vehicle speed coordinates;

first and second sets of power off duty cycle control data, said first and second sets of power off duty cycle control data being organized in the form of first and second tables, said first and second tables each defining a duty cycle schedule which is plotted in terms of duty cycle and vehicle speed;

a control circuit for controlling said line pressure control solenoid, said control circuit including a memory in which said first and second sets of power on duty cycle data and said first and second sets of power off duty cycle data, are recorded, said control circuit including circuit means which is responsive to engine load and vehicle speed for determining a need to induce a shift between gears of said transmission and for conditioning said transmission in a manner which induces said shift to occur, said control circuit being further responsive to said engine load indicating means for:

when said engine load indicating means indicates that a load on the engine exists, selecting said first and second sets of power on duty cycle control data and for sequentially using said first and second sets of power on duty cycle data one after the other to control the operation of said line pressure control solenoid during the time the shift between gears is occurring, and for when said engine load indicating means indicates that a load on the engine is absent, selecting said first and second sets of power off duty cycle control data and for sequentially using said first and second sets of power off duty cycle data to control the operation of said line pressure control solenoid during the time the shift between gears is occurring.

2. A control system for an automatic transmission as claimed in claim 1 wherein said circuit means which is responsive to engine load and vehicle speed for determining the need to induce a shift between gears and for conditioning said transmission in a manner which induces said shift to occur, further comprising:

means for sensing rotational speeds of said input and output shafts and for developing a ratio based on the two rotational speeds;

first and second shift solenoids, said first and second shift solenoids being arranged to be selectively energizable in a manner which induces the supply of line pressure to selected friction elements of the transmission and for selectively conditioning said transmission to produce a selected gear;

shift control data, said shift control data being organized in terms of said ratio and engine load, said shift control data defining first and second ratio thresholds; and means for comparing said ratio with said first and second thresholds and for controlling the energization of said first and second shift solenoids based on the comparison.

3. A control system as claimed in claim 2 wherein said control circuit is responsive to the comparison of said ratio with the first and second ratio thresholds defined by said shift control data, said control circuit being arranged such that:

when said load indicating means indicates that a load on the engine exists said control circuit controls the changing of said first set of power on duty cycle control data to said second set of power on duty cycle control data, and such that:

when said load indicating means indicates that a load on the engine absent said control circuit controls the changing of said first set of power off duty cycle control data to said second set of power off duty cycle control data.

4. A control system as claimed claim 3 further comprising:

a non-shift mode line pressure control schedule, said non-shift mode line pressure control schedule being defined in terms of line pressure solenoid duty cycle and engine load, said non-shift mode line pressure schedule being used to control the operation of said line pressure control solenoid when said transmission is not undergoing a shift operation and is being controlled by a control circuit in a non-shifting mode of control, said non-shift mode line pressure control schedule being recorded in the memory of said control circuit.

5. A control system as claimed in claim 4 further comprising:

a timer, said timer being arranged to start counting over a predetermined period of time when said control circuit initiates a shift between the gears of said transmission, said control circuit being arranged to revert from a shifting mode of control to said non-shifting mode of control when said timer finishes counting over said predetermined period of time, the change from said shifting mode of control to said non-shifting mode including the use of said non-shift line pressure control schedule.

6. A transmission control system comprising means for discerning between a power on shift and a power off shift, said power on shift being one wherein an engine which is associated with a transmission controlled by said transmission control system is subject to a load, and said power off shift being one wherein load on said engine is absent;

means for selecting first and second sets of power on duty cycle control data when said discerning means discerns a power on shift occurring, said first and second sets of power on duty cycle control data being organized in the form of first and second maps, said first and second maps containing duty cycle values which are each located at different engine load and vehicle speed coordinates;

means for selecting first and second sets of power off duty cycle control data when said discerning means discerns a power off shift occurring, said first and second sets of power off duty cycle control data being organized in the form of first and second tables, said first and second tables each defining a duty cycle schedule which is plotted in terms of duty cycle and vehicle speed; and means for utilizing the selected first and second sets of data sequentially one after the other to control the operation of a line pressure control solenoid during a shift of the transmission controlled by said control system.

7. A transmission control system as claimed in claim 6 further comprising:

a non-shift mode line pressure control schedule, said non-shift mode line pressure control schedule being defined in terms of line pressure solenoid duty cycle and engine load, said non-shift mode line pressure schedule being used to control the operation of said line pressure control solenoid when said transmission is not undergoing a shift operation and is being controlled by a control circuit in a non-shifting mode of control, said non-shift mode line pressure control schedule being recorded in the memory of said control circuit.

8. A transmission control system as claimed in claim 7 further comprising:

a timer, said timer being arranged to start counting over a predetermined period of time when said transmission enters a shifting mode of operation, said control circuit being arranged to revert from said shifting mode of control to said non-shifting mode of control when said timer finishes counting over said predetermined period of time, the change from said shifting mode of control to said non-shifting mode including the use of said non-shift line pressure control schedule.

9. A method of operating a transmission control system comprising the steps of discerning between a power on shift and a power off shift;

selecting first and second sets of power on duty cycle control data when said discerning means discerns a power on shift occurring, said first and second sets of power on duty cycle control data being organized in the form of first and second maps, said first and second maps containing duty cycle values which are each located at different engine load and vehicle speed coordinates;

selecting first and second sets of power off duty cycle control data when said discerning means discerns a power off shift occurring, said first and second sets of power off duty cycle control data being organized in the form of first and second tables, said first and second tables each defining a duty cycle schedule which is plotted in terms of duty cycle and vehicle speed; and utilizing the selected first and second sets of data sequentially one after the other to control the operation of line pressure control solenoid during a shift of the transmission controlled by said control system.

10. A method as claimed in claim 9 further comprising the step of:

using a non-shift mode line pressure control schedule, said non-shift mode line pressure control schedule being defined in terms of line pressure solenoid duty cycle and engine load, said non-shift mode line pressure schedule being used to control the operation of said line pressure control solenoid when said transmission is not undergoing a shift operation and is being controlled by a control circuit in a non-shifting mode of control, said non-shift mode line pressure control schedule being recorded in the memory of said control circuit.

11. A method as claimed in claim 10 further comprising the step of:

using a timer to counting over a predetermined period of time when said transmission enters a shifting mode of operation; and reverting from said shifting mode of control to said non-shifting mode of control when said timer finishes counting over said predetermined period of time, the change from said shifting mode of control to said non-shifting mode including the use of said non-shift line pressure control schedule.

* * * * *